United States Patent
Iida et al.

(10) Patent No.: US 10,160,883 B2
(45) Date of Patent: Dec. 25, 2018

(54) ROOM-TEMPERATURE-CURABLE POLYORGANOSILOXANE COMPOSITION AND ELECTRIC/ELECTRONIC APPARATUS

(71) Applicant: MOMENTIVE PERFORMANCE MATERIALS JAPAN LLC, Tokyo (JP)

(72) Inventors: Isao Iida, Tokyo (JP); Takeshi Sunaga, Tokyo (JP)

(73) Assignee: MOMENTIVE PERFORMANCE MATERIALS JAPAN LLC, Tokyo (JP)

( * ) Notice: Subject to any disclaimer, the term of this patent is extended or adjusted under 35 U.S.C. 154(b) by 202 days.

(21) Appl. No.: 15/190,916

(22) Filed: Jun. 23, 2016

(65) Prior Publication Data

US 2016/0304745 A1 Oct. 20, 2016

Related U.S. Application Data (63) Continuation of application No. PCT/JP2014/083054, filed on Dec. 12, 2014.

(30) Foreign Application Priority Data

Dec. 24, 2013 (JP) .................................. 2013-266101

(51) Int. Cl.
C08L 83/00 (2006.01)
C08L 83/06 (2006.01)
(Continued)

(52) U.S. Cl.
CPC ............. *C09D 183/06* (2013.01); *B05D 1/02* (2013.01); *C08L 83/06* (2013.01); *C08G 77/18* (2013.01)

(58) Field of Classification Search
None
See application file for complete search history.

(56) References Cited

U.S. PATENT DOCUMENTS 3,839,246 A * 10/1974 Hamilton, Jr. ........... C08K 5/54
523/213
3,888,815 A * 6/1975 Bessmer ................. C08L 83/04
524/703
(Continued)

FOREIGN PATENT DOCUMENTS

JP 04-359058 A 12/1992
JP 07-173435 A 7/1995
(Continued)

OTHER PUBLICATIONS

Huang Yingchang et al., "Elastomeric Sealant and Adhesive" pp. 365-367, Chemical Industry Press, First Edition, Sep. 2003.
(Continued)

*Primary Examiner* — Peter A Salamon
(74) *Attorney, Agent, or Firm* — Foley & Lardner LLP (57) ABSTRACT

There is provided a room-temperature-curable polyorganosiloxane composition having low viscosity and good coatability without any solvent and forming a cured coating film excellent in scratch resistance. The room-temperature-curable polyorganosiloxane composition contains: (A) 100 parts by mass of a mixture of (A1) 10 to 80 parts by mass of a polyorganosiloxane having two or more alkoxy groups bonded to silicon atoms and a prescribed viscosity, and (A2) 90 to 20 parts by mass of a polyorganosiloxane represented by an average composition formula: $R^1_a Si(OR^2)_b O_{\{4-(a+b)\}/2}$ ($R^1$ and $R^2$ represent prescribed group respectively, and a and b are prescribed positive numbers), having an Mw of 2,000 to 100,000 and a three-dimensional network structure, and being in a solid state or in a semisolid state at normal (Continued)

temperature; and (B) 0.1 to 15 parts by mass of an organic titanium compound.

5 Claims, 1 Drawing Sheet

(51) Int. Cl.
    *C09D 183/06*     (2006.01)
    *C08G 77/18*     (2006.01)
    *B05D 1/02*     (2006.01)

(56) References Cited

U.S. PATENT DOCUMENTS

| | | | | |
|---|---|---|---|---|
| 3,897,376 A | * | 7/1975 | Lampe | C08L 83/04 128/864 |
| 3,956,209 A | * | 5/1976 | Hamilton, Jr. | C08K 5/57 525/477 |
| 4,293,597 A | * | 10/1981 | Bessmer | C08L 83/04 427/186 |
| 4,461,854 A | * | 7/1984 | Smith | C08K 9/10 523/211 |
| 4,554,187 A | | 11/1985 | Grape et al. | |
| 5,004,793 A | * | 4/1991 | Nagaoka | C08G 77/455 528/15 |
| 5,286,766 A | * | 2/1994 | Arai | C08K 3/36 523/209 |
| 5,576,054 A | * | 11/1996 | Brown | C03C 17/30 427/160 |
| 5,969,057 A | * | 10/1999 | Schoeley | C08L 83/04 525/474 |
| 2002/0065385 A1 | * | 5/2002 | Araki | C08K 5/54 528/10 |
| 2007/0282047 A1 | * | 12/2007 | Kimura | C08L 83/04 524/261 |
| 2010/0234517 A1 | | 9/2010 | Plantenberg et al. | |
| 2011/0124788 A1 | * | 5/2011 | Iida | C08K 5/54 524/403 |
| 2013/0303676 A1 | * | 11/2013 | Otashiro | C08L 83/00 524/443 |
| 2015/0140346 A1 | * | 5/2015 | Iida | C09D 7/63 428/447 |

FOREIGN PATENT DOCUMENTS

| | | |
|---|---|---|
| JP | 07-238259 A | 9/1995 |
| JP | 2002-097367 A | 4/2002 |
| JP | 2010-024327 A | 2/2010 |
| JP | 2010-084063 A | 4/2010 |
| JP | 2010-180382 A | 8/2010 |
| JP | 2013-124343 A | 6/2013 |
| WO | WO-2010/008036 A1 | 1/2010 |
| WO | WO-2014/017397 A1 | 1/2014 |

OTHER PUBLICATIONS

Office Action dated Sep. 18, 2018 in China Application No. 201480070993.8 with its partial English translation.

* cited by examiner

FIG. 1

ROOM-TEMPERATURE-CURABLE POLYORGANOSILOXANE COMPOSITION AND ELECTRIC/ELECTRONIC APPARATUS

CROSS-REFERENCE TO RELATED APPLICATIONS

This application is a continuation of prior International Application No. PCT/JP2014/083054 filed on Dec. 12, 2014 which is based upon and claims the benefit of priority from Japanese Patent Application No. 2013-266101 filed on Dec. 24, 2013; the entire contents of all of which are incorporated herein by reference.

FIELD

The present invention relates to a room-temperature-curable polyorganosiloxane composition and an electric/electronic apparatus and, in particular, to a room-temperature-curable polyorganosiloxane composition forming a cured coating film excellent in scratch resistance and useful as a coating material or the like for an electric/electronic apparatus and an electric/electronic apparatus having the cured coating film of the room-temperature-curable polyorganosiloxane composition.

BACKGROUND

Conventionally, various room-temperature-curable polyorganosiloxane compositions which cure at room temperature to produce cured products in a rubber form or the like have been known. Among them, for the use such as a coating material, a potting material, and the like of electric/electronic components, the one of a type that causes a curing reaction by coming into contact with moisture in the air and emits alcohol, acetone, or the like during curing is generally used. The type of room-temperature-curable polyorganosiloxane composition has advantages that it has good workability, is less likely to corrode an electrode and wiring because alcohol or acetone emitted during curing has less corrosiveness with respect to metals, and is excellent also in adhesiveness and so on.

Especially as a conformal coating agent applied to protect electric/electronic components and a surface of a circuit board having these components mounted thereon from a use environment, a coating material made of a low-viscosity room-temperature-curable polyorganosiloxane composition (for example, refer to Patent Reference 1 (JP-A H07-173435) and Patent Reference 2 (JP-A H07-238259)) and a coating material of a type in which a silicone resin is dissolved in a solvent, are used.

However, a cured coating film obtained from the coating material made of the low-viscosity room-temperature-curable polyorganosiloxane composition is fragile and low in hardness and does not have sufficient scratch strength such as scratch resistance. Besides, a coating material of a solvent type containing a silicone resin needs a solvent removal process by heating at the time of curing, and therefore volatilization of a solvent may worsen work environment and cause corrosion and deterioration of the electric/electronic components and the circuit board having these components mounted thereon. Further, when the solvent is tried to be recovered without being released into the air in order to improve the work environment, a large amount of investment is required.

SUMMARY OF THE INVENTION

The present invention has been made to solve such problems, and its object is to provide a room-temperature-curable polyorganosiloxane composition having low viscosity and good coatability without any solvent and forming a cured coating film high in hardness and excellent in scratch resistance.

A room-temperature-curable polyorganosiloxane composition of the present invention, contains:

(A) 100 parts by mass of a polyorganosiloxane mixture obtained by mixing (A1) 10 to 80 parts by mass of a polyorganosiloxane having two or more alkoxy groups bonded to silicon atoms in a molecule and a viscosity at 23° C. of 3 mPa·s to 500 mPa·s, and (A2) 90 to 20 parts by mass of a polyorganosiloxane represented by an average composition formula (a2), having a weight-average molecular weight (Mw) of 2,000 to 100,000 and a three-dimensional network structure, and being in a solid state or in a semisolid state at normal temperature, $$R^1_a Si(OR^2)_b O_{\{4-(a+b)\}/2} \quad (a2)$$

where $R^1$ represents an unsubstituted monovalent hydrocarbon group or a monovalent hydrocarbon group in which part of hydrogen atoms is substituted by a halogen atom or a cyano-alkyl group, $R^2$ represents an alkyl group or an alkoxy-substituted alkyl group being an alkyl group in which part of hydrogen atoms is substituted by an alkoxy group, and a and b are positive numbers satisfying $0.5 \leq a \leq 1.5$ and $0 < b < 3$, and (B) 0.1 to 15 parts by mass of an organic titanium compound as a curing catalyst.

An electric/electronic apparatus of the present invention includes, a coating film made of a cured product of the room-temperature-curable polyorganosiloxane composition of the present invention on a surface of an electrode and/or wiring.

In the present invention, the "room temperature" means normal temperature without any heating or cooling and indicates, for example, 23° C. Besides, the "solid state" means an ordinary so-called solid state having no fluidity. The "semisolid state" means a state having slight fluidity and thus not the solid state but a state with high viscosity to a degree with which it is not recognized as a liquid state, such as a viscous starch syrup state. More specifically, the "semisolid state" refers to a state having high viscosity, for example, a viscosity of 10 Pa·s or more and having slight fluidity.

The room-temperature-curable polyorganosiloxane composition of the present invention has low viscosity and good coatability and can be applied as it is by an ordinary coating method without being diluted with a solvent. A coating film quickly cures at room temperature, and forms a cured coating film having a high hardness (Type A) of 60 or more and excellent in scratch resistance. Therefore, it is useful for the use such as a coating material, a potting material, and the like of an electric/electronic apparatus, and is particularly suitable for the use for coating electric/electronic components, such as a conformal coating agent.

DETAILED DESCRIPTION

Hereinafter, embodiments of the present invention will be described. A room-temperature-curable polyorganosiloxane composition in the embodiment of the present invention, contains:

(A) 100 parts by mass of a polyorganosiloxane mixture obtained by mixing, at a specific ratio, (A1) a first polyorganosiloxane having two or more alkoxy groups bonded to silicon atoms in a molecule and a viscosity at 23° C. of 3 mPa·s to 500 mPa·s, and being in a liquid state at normal temperature, and (A2) a second polyorganosiloxane represented by the above average composition formula (a2), having a three-dimensional network structure and a weight-average molecular weight (Mw) of 2,000 to 100,000, and being in a solid state or in a semisolid state at normal temperature; and (B) 0.1 to 15 parts by mass of an organic titanium compound as a curing catalyst. The room-temperature-curable polyorganosiloxane composition in the embodiment can further contain (C) a silane compound represented by a later-described formula (c1). Hereinafter, components constituting the room-temperature-curable polyorganosiloxane composition in the embodiment, their content ratios and so on will be described.

(A) Polyorganosiloxane Mixture

The polyorganosiloxane mixture being the (A) component in the embodiment of the present invention is a polymer component that is a base of the composition and is obtained by mixing (A1) the first polyorganosiloxane having two or more alkoxy groups bonded to silicon atoms in a molecule, being in a liquid state at normal temperature, and having a viscosity at 23° C. (hereinafter, referred to simply as a viscosity) of 3 mPa·s to 500 mPa·s, and (A2) the second polyorganosiloxane represented by the above average composition formula (a2), having a three-dimensional network structure and a weight-average molecular weight (Mw) of 2,000 to 100,000, and being in a solid state or in a semisolid state at normal temperature. Note that the Mw is a value obtained by GPC (gel permeation chromatograph) based on polystyrene.

(A1) Component

The molecular structure of the first polyorganosiloxane being the (A1) component may be linear or a structure having a branched chain (hereinafter, referred to as branched) as long as it has two or more alkoxy groups bonded to silicon atoms in a molecule and a viscosity of 3 mPa·s to 500 mPa·s. The linear polyorganosiloxane is preferable because the viscosity is easily set to the above-described range. Note that in the case of using the branched polyorganosiloxane, it is preferably used in combination with the linear polyorganosiloxane in order to maintain the viscosity specified in the above as the whole (A1) component.

The viscosity of the (A1) component is 3 mPa·s to 500 mPa·s. When the viscosity of the (A1) component is less than 3 mPa·s, a cured product to be obtained becomes poor in rubber elastic, whereas when it exceeds 500 mPa·s, the workability when fabricating a cured product such as a cured coating film decreases. Further, when the viscosity of the (A1) component exceeds 500 mPa·s, the compatibility with a later-described (A2) component is poor, resulting in failure to obtain a uniform composition. The viscosity of the (A1) component is preferably within a range of 5 mPa·s to 100 mPa·s.

The (A1) component can be composed of one kind or two or more kinds of polyorganosiloxanes. When the (A1) component is composed of one kind of polyorganosiloxane, the polyorganosiloxane has two or more alkoxy groups in a molecule and has a viscosity of 3 mPa·s to 500 mPa·s. When the (A1) component is composed of a mixture of two or more kinds of polyorganosiloxanes, the mixture only needs to satisfy the specifications of the number of alkoxy groups and the viscosity. Accordingly, in this case, the structure and viscosity of the individual polyorganosiloxane do not necessarily need to satisfy the above specifications, but the structure and viscosity of the individual polyorganosiloxane constituting the (A1) polyorganosiloxane preferably satisfy the above specifications.

When the (A1) component is the linear polyorganosiloxane, the two or more alkoxy groups bonded to silicon atoms may be bonded to silicon atoms at ends of a molecule or silicon atoms at an intermediate portion. At least one alkoxy group is preferably bonded to a silicon atom at an end of the molecule. In this case, all of alkoxy groups contained in the linear polyorganosiloxane may be bonded to silicon atoms at the ends of the molecule, or at least one alkoxy group may be bonded to a silicon atom at the intermediate portion.

As the linear polyorganosiloxane constituting the (A1) component, a both ends alkoxysilyl group-terminated polyorganosiloxane represented by the following general formula (a11) is preferable. In this description, the polyorganosiloxane represented by the formula (a11) is referred to also as a polyorganosiloxane (a11). Hereinafter, for compounds represented by other formulas, abbreviated names including symbols representing the formulas are also similarly used in some cases.

(a11)

In the formula (a11), $R^5$ represents an alkyl group or an alkoxy-substituted alkyl group being an alkyl group in which part of hydrogen atoms is substituted by an alkoxy group. A plurality of $R^5$s may be the same with or different from each other. Concrete examples of the above $R^5$ include a methyl group, an ethyl group, a propyl group, a butyl group and the like, and concrete examples of the alkoxy-substituted alkyl group include a 2-methoxyethyl group, a 2-ethoxyethyl group, a 3-methoxypropyl group and the like. $R^5$ is preferably the methyl group.

$R^6$ represents an unsubstituted monovalent hydrocarbon group or a monovalent hydrocarbon group in which part of hydrogen atoms is substituted by a halogen atom or a cyano-alkyl group. A plurality of $R^6$s may be the same with or different from each other. $R^7$ also represents an unsubstituted monovalent hydrocarbon group or a monovalent hydrocarbon group in which part of hydrogen atoms is substituted by a halogen atom or a cyano-alkyl group. A plurality of $R^7$s may be the same with or different from each other.

Concrete examples of the unsubstituted monovalent hydrocarbon group being $R^6$ and $R^7$ include: alkyl groups such as a methyl group, an ethyl group, a propyl group, a butyl group, a pentyl group, a hexyl group, an octyl group, a decyl group, and a dodecyl group; cycloalkyl groups such as a cyclohexyl group; alkenyl groups such as a vinyl group and an allyl group; aryl groups such as a phenyl group, a tolyl group, and a xylyl group; and aralkyl groups such as a benzyl group, a 2-phenylethyl group, and a 2-phenylpropyl group. Examples of the substituted monovalent hydrocarbon group include: halogenated alkyl groups in which part of hydrogen atoms of the above monovalent hydrocarbon group is substituted by a halogen atom such as a chloromethyl group, a 3-chloropropyl group, and a 3,3,3-trifluoropropyl group; a 3-cyanopropyl group, and the like in which part of hydrogen atoms of the above monovalent hydrocarbon group is substituted by a cyano-alkyl group.

$R^6$ and $R^7$ are preferably a methyl group because it is easily synthesized, has low viscosity with respect to the molecular weight, and provides excellent physical properties to a cured product (cured coating film). However, when it is necessary to impart heat resistance and cold resistance to the cured coating film, part of $R^6$s and/or $R^7$s is preferably an aryl group such as a phenyl group.

In the formula (a11), X is a bivalent oxygen (oxy group) or a bivalent hydrocarbon group. Two Xs may be the same or different. Examples of the bivalent hydrocarbon group include: alkylene groups such as a methylene group, an ethylene group, a propylene group, and a trimethylene group; and arylene groups such as a phenylene group. Because of easy synthesis, the bivalent oxygen atom (oxy group) or the ethylene group is preferable and the oxy group is particularly preferable.

In the formula (a11), d is 0 or 1. And n is an integer so that the viscosity of the polyorganosiloxane (a11) becomes 3 mPa·s to 500 mPa·s and concretely an integer of 1≤n<250. The viscosity of the polyorganosiloxane (a11) is preferably in a range of 5 mPa·s to 100 mPa·s, and the value of n is preferably an integer from 3 to 100.

The polyorganosiloxane (a11) can be obtained by end-capping, with methyltrimethoxysilane or the like, a diorganopolysiloxane containing hydroxyl groups at both ends which is obtained by subjecting a cyclic diorganosiloxane oligomer such as an octamethylsiloxane to ring-opening polymerization or ring-opening copolymerization with an acid catalyst or an alkaline catalyst under the presence of water.

Preferable examples of the polyorganosiloxane (a11) include polydimethylsiloxanes having methyldimethoxysilyl groups or trimethoxysilyl groups at both ends represented by the following formula (where d is 0 or 1, n is the same as in the formula (a11) including preferable aspects).

Besides, as the (A1) component, a branched polyorganosiloxane can be used which has a trifunctional siloxane unit (where one organic group bonded to silicon is an unsubstituted monovalent hydrocarbon group or a monovalent hydrocarbon group in which part of hydrogen atoms is substituted by a halogen atom or a cyano-alkyl group) and/or a tetrafunctional siloxane unit. Hereinafter, the trifunctional siloxane unit is expressed as a T unit, and the tetrafunctional siloxane unit is expressed as a Q unit. The branched polyorganosiloxane may independently constitute the (A1) component or may be used together with the linear polyorganosiloxane, for example, the polyorganosiloxane (a11) to constitute the (A1) component. Because the viscosity as the (A1) component is easily adjusted to the above specified range, the branched polyorganosiloxane is preferably used together with the linear polyorganosiloxane.

Note that the branched polyorganosiloxane can contain a monofunctional siloxane unit (where three organic groups bonded to silicon are independently unsubstituted monovalent hydrocarbon groups or monovalent hydrocarbon groups in each of which part of hydrogen atoms is substituted by a halogen atom or a cyano-alkyl group) and/or a bifunctional siloxane unit (where two organic groups bonded to silicon are independently unsubstituted monovalent hydrocarbon groups or monovalent hydrocarbon groups in each of which part of hydrogen atoms is substituted by a halogen atom or a cyano-alkyl group). Hereinafter, the monofunctional siloxane unit is expressed as an M unit, and the bifunctional siloxane unit is expressed as a D unit.

As the branched polyorganosiloxane, a polyorganosiloxane containing the D unit and the T unit is preferable. In this case, the content molar ratio between the D unit and the T unit is preferably D:T=1:99 to 99:1. D:T=10:90 to 90:10 is more preferably. The molecular weight of the branched polyorganosiloxane is the molecular weight with which the viscosity as the (A1) component can be set to the specified viscosity.

The viscosity of the branched polyorganosiloxane, when independently used, is also 3 mPa·s to 500 mPa·s, and is preferably in a range of 5 mPa·s to 100 mPa·s as with the linear polyorganosiloxane. As for the viscosity, in the case where the branched polyorganosiloxane is combined with the above-described linear polyorganosiloxane, for example, the polyorganosiloxane (a11), the viscosity when they constitute the (A1) component only needs to be in the above-described range.

The branched polyorganosiloxane used as the above (A1) component has two or more alkoxy groups bonded to silicon atoms in a molecule. The alkoxy group may be bonded to a silicon atom in any unit. When the branched polyorganosiloxane is the polyorganosiloxane containing the D unit and the T unit, 80% or more of the two or more alkoxy groups bonded to silicon atoms are preferably bonded to the silicon atoms in the T units. More preferably, all of the alkoxy groups are bonded to silicon atoms in the T units.

Examples of the alkoxy group contained in the branched polyorganosiloxane include the same groups as those of $OR^5$ in the formula (a11) representing the polyorganosiloxane (a11). As the alkoxy group, a methoxy group and an ethoxy group are preferable. Examples of the organic group bonded to the silicon atom contained in the branched polyorganosiloxane, namely, the unsubstituted monovalent hydrocarbon group or the monovalent hydrocarbon group in which part of hydrogen atoms is substituted by a halogen atom or a cyano-alkyl group, include the same groups as those of $R^6$ in the formula (a11) representing the polyorganosiloxane (a11). As the organic group, a methyl group is preferable.

Further, as the (A1) component, a polyorganosiloxane being a partially hydrolyzed condensate of a silane compound represented by a formula (a12) can be used together with the above-described linear polyorganosiloxane, for example, the polyorganosiloxane (a11).

Further, as the (A1) component, the partially hydrolyzed condensate of the silane compound (a12) can also be compounded into a mixture of the linear polyorganosiloxane, for example, the polyorganosiloxane (a11) and the branched polyorganosiloxane. In addition, as for the linear polyorganosiloxane, for example, the polyorganosiloxane (a11), the branched polyorganosiloxane, and the partially hydrolyzed condensate of the silane compound (a12), one kind of them may be independently used or two or more kinds of them may be used in mixture respectively.

In the formula (a12), $R^8$ represents an unsubstituted monovalent hydrocarbon group or a monovalent hydrocarbon group in which part of hydrogen atoms is substituted by a halogen atom or a cyano-alkyl group, and examples of $R^8$ include the same groups as those of R$^6$ in the formula (a11) representing the above-described linear polyorganosiloxane (a11). R$^8$ is preferably a methyl group, a vinyl group or the like. Besides, R$^9$ represents an alkyl group or an alkoxy-substituted alkyl group and examples of R$^9$ include the same groups as those of R$^5$ in the formula (a11) representing the above-described linear polyorganosiloxane (a11). R$^9$ is preferably a methyl group, an ethyl group or the like. In the formula (a12), e is 0, 1 or 2.

Examples of the silane compound (a12) being a starting material of the partially hydrolyzed condensate include tetramethoxysilane, tetraethoxysilane, methyltrimethoxysilane, vinyltrimethoxysilane, phenyltrimethoxysilane, methyltriethoxysilane, vinyltriethoxysilane, phenyltriethoxysilane, tetrapropoxysilane, tetraisopropoxysilane, dimethyldimethoxysilane, diphenyldimethoxysilane, vinylmethyldimethoxysilane, dimethyldiethoxysilane, and the like. Besides, the partially hydrolyzed condensate is obtained by partially hydrolyzing the silane compound such as methyltrimethoxysilane with an acid catalyst or an alkaline catalyst under the presence of water. Further, it is obtained by endcapping the silanol group generated by the partial hydrolysis, with methyltrimethoxysilane or the like.

As for the viscosity of the polyorganosiloxane being the partially hydrolyzed condensate of the silane compound (a12), the viscosity when it is combined with the above-described linear polyorganosiloxane, for example, the polyorganosiloxane (a11) or the above-described branched polyorganosiloxane to constitute the (A1) component only needs to be 3 mPa·s to 500 mPa·s as with the branched polyorganosiloxane. The viscosity of the polyorganosiloxane being the partially hydrolyzed condensate of the silane compound (a12) is preferably in a range of 5 mPa·s to 100 mPa·s.

As the number of Si atoms in the partially hydrolyzed condensate of the silane compound (a12), a number with which the viscosity of the partially hydrolyzed condensate becomes in the above-described range is selected.

In the case where, for example, the polyorganosiloxane (a11) and the partially hydrolyzed condensate of the silane compound (a12) are used in combination as the (A1) component, the ratio between the polyorganosiloxane (a11) and the partially hydrolyzed condensate of the silane compound (a12) is preferably a ratio that the partially hydrolyzed condensate of the silane compound (a12) is 1 to 200 parts by mass and more preferably 10 to 100 parts by mass, when the polyorganosiloxane (a11) is 100 parts by mass.

(A2) Component

The second polyorganosiloxane being the (A2) component is a polyorganosiloxane represented by an average composition formula (a2) having a three-dimensional network structure, being in a solid state or in a semisolid state at normal temperature (23° C.), and having an Mw of 2,000 to 100,000.

$$R^1{}_a Si(OR^2)_b O_{\{4-(a+b)\}/2} \qquad (a2)$$

In the formula (a2), R$^1$ represents an unsubstituted monovalent hydrocarbon group or a monovalent hydrocarbon group in which part of hydrogen atoms is substituted by a halogen atom or a cyano-alkyl group, and examples of R$^1$ include the same groups as those of R$^6$ in the formula (a11) representing the above-described linear polyorganosiloxane (a11). R$^1$ is preferably a methyl group. Besides, R$^2$ represents an alkyl group or an alkoxy-substituted alkyl group being an alkyl group in which part of hydrogen atoms is substituted by an alkoxy group, and examples of R$^2$ include the same groups as those of R$^5$ in the formula (a11) representing the above-described linear polyorganosiloxane (a11). R$^2$ is preferably a methyl group.

In the formula (a2), a and b are positive numbers satisfying 0.5≤a≤1.5 and 0<b<3. Preferably a and b are positive numbers satisfying 0.8≤a≤1.5 and 0<b<1. More preferably a and b are positive numbers satisfying 0.9≤a≤1.4 and 0<b<0.5.

The polyorganosiloxane (a2) can be obtained, for example, by a method of hydrolyzing alkoxysilanes to prepare a polyorganosiloxane containing a silanol group and having a three-dimensional network structure, and then endcapping the polyorganosiloxane with alkoxysilane.

The Mw of the (A2) component is preferably 2,000 to 50,000, and more preferably 3,000 to 30,000. The (A2) component is composed of one kind or two or more kinds of the polyorganosiloxanes (a2). When the (A2) component is composed of one kind of the polyorganosiloxane (a2), the Mw of the (a2) component is 2,000 to 100,000. When the (A2) component is composed of a plurality of kinds of the polyorganosiloxanes (a2), the Mw of each polyorganosiloxane (a2) does not necessarily need to be 2,000 to 100,000 as long as the Mw of the (A2) component is 2,000 to 100,000, but preferably falls within the above range. The Mw of the polyorganosiloxane (a2) is also preferably 2,000 to 50,000, and more preferably 3,000 to 30,000.

The (A) component being the base component of the room-temperature-curable polyorganosiloxane composition of the present invention is constituted by mixing the second polyorganosiloxane (A2) having an Mw of 2,000 to 100,000 and a three-dimensional network structure and being in a solid state or in a semisolid state at normal temperature and the above-described first polyorganosiloxane (A1) being in a liquid state at normal temperature and having a predetermined viscosity.

The mixture ratio between the (A1) component and the (A2) component is that the (A1) component is 10 to 80 parts by mass and the (A2) component is 90 to 20 parts by mass when the whole (A) component is 100 parts by mass. When the compounding amount of the (A1) component is less than 10 parts by mass and the compounding amount of the (A2) component exceeds 90 parts by mass, it is difficult to obtain a composition usable as it is as a coating material without solvent. Besides, when the compounding amount of the (A1) component exceeds 80 parts by mass and the compounding amount of the (A2) component is less than 20 parts by mass, it is impossible to obtain a cured coating film having sufficient scratch resistance. The compounding ratio between the (A1) component and the (A2) component is more preferably in a range that the (A1) component is 10 to 70 parts by mass and the (A2) component is 90 to 30 parts by mass, and furthermore preferably in a range that the (A1) component is 20 to 60 parts by mass and the (A2) component is 80 to 40 parts by mass.

(B) Component

In the room-temperature-curable polyorganosiloxane composition of the present invention, the organic titanium compound being the (B) component is a curing catalyst for forming a crosslinked structure by causing reaction between the alkoxy groups of the (A) component composed of the (A1) component and the (A2) component, and/or reaction between the alkoxy group of the (A) component and the alkoxy group of the cross-linking agent being the later-described (C) component, under the presence of water.

Examples of the organic titanium compound being the (B) curing catalyst include tetraethoxytitanium, tetrapropoxytitanium, tetrabutoxytitanium, diisopropoxy-bis(ethyl acetoacetate) titanium, diisopropoxy-bis(methyl acetoacetate) titanium, diisopropoxy-bis(acetylacetone) titanium, dibutoxy-bis(ethyl acetoacetate) titanium, dimethoxy-bis(ethyl acetoacetate) titanium, and the like. As for these organic titanium compounds, one kind may be individually used or two or more kinds may be used in mixture. Among them, titanium chelates such as diisopropoxy-bis(ethyl acetoacetate) titanium is particularly preferable because it has high catalytic ability even when existing in a small amount and can produce the composition with less impurities.

Note that in the room-temperature-curable polyorganosiloxane composition, as the curing catalyst for promoting the reaction between the alkoxy groups of the base component or the reaction between the alkoxy group of the base component and the alkoxy group of the cross-linking agent, an organic tin compound such as dibutyltin dioctoate or dibutyltin dilaurate is sometimes used, but when the organic tin compound is used as the curing catalyst, it takes too much time for the curing, which is not preferable. In the embodiment of the present invention, from the viewpoint of both curability (curing speed) of the composition and scratch resistance of the cured coating film, the above-described organic titanium compound is used.

A compounding amount of the organic titanium compound being the component (B) relative to 100 parts by mass of the above (A) component is 0.1 to 15 parts by mass, and preferably 0.1 to 10 parts by mass. When the compounding amount is less than 0.1 parts by mass, it does not sufficiently function as the curing catalyst, and not only it takes a long time for the curing but also the curing especially in a deep portion distant from a contact surface with the air becomes insufficient. On the other hand, when the compounding amount exceeds 15 parts by mass, an effect worth the compounding amount is not obtained, which is not only meaningless but also uneconomical. Further, the storage stability also deteriorates.

(C) Component

In the embodiment of the present invention, (C) the silane compound represented by the formula (c1) can be contained.

$$R^3{}_cSi(OR^4)_{4-c} \quad (c1)$$

The silane compound works as a cross-linking agent of the base polymer being the above (A) component.

In the formula (c1), $R^3$ represents an unsubstituted monovalent hydrocarbon group or a monovalent hydrocarbon group in which part of hydrogen atoms is substituted by a halogen atom or a cyano-alkyl group, and examples of $R^3$ include the same groups as those of $R^6$ in the formula (a11) representing the above-described polyorganosiloxane (a11). $R^3$ is preferably a methyl group, a vinyl group or the like. Besides, $R^4$ represents an alkyl group or an alkoxy-substituted alkyl group, and examples of $R^4$ include the same groups as those of $R^5$ in the formula (a11) representing the above-described polyorganosiloxane (a11). $R^4$ is preferably a methyl group, an ethyl group or the like. In the formula (c1), c is 0, 1 or 2.

Examples of the silane compound (c1) include tetramethoxysilane, tetraethoxysilane, methyltrimethoxysilane, vinyltrimethoxysilane, phenyltrimethoxysilane, methyltriethoxysilane, vinyltriethoxysilane, phenyltriethoxysilane, tetrapropoxysilane, tetraisopropoxysilane, dimethyldimethoxysilane, diphenyldimethoxysilane, vinylmethyldimethoxysilane, dimethyldiethoxysilane, and the like. As for these silane compounds, one kind may be individually used or two or more kinds may be used in mixture.

As the silane compound (c1) being the cross-linking agent, tetramethoxysilane, tetraethoxysilane, methyltrimethoxysilane, vinyltrimethoxysilane, dimethyldimethoxysilane, vinylmethyldimethoxysilane, or dimethyldiethoxysilane is preferably used because they are easily synthesized, do not impair storage stability of the composition, less corrode metals, and provides a high cross-linking reaction speed, that is, curing speed, and methyltrimethoxysilane is particularly preferably used.

When the (C) silane compound is compounded, its compounding amount is 0.1 to 15 parts by mass, and is preferably 1 to 10 parts by mass relative to 100 parts by mass of the above (A) component. When the compounding amount of the (C) component exceeds 15 parts by mass, a shrinkage percentage at the time of curing becomes large, and a physical property after the curing decreases. Further, the curing speed becomes very slow, which is economically disadvantageous.

In the room-temperature-curable polyorganosiloxane composition in the embodiment, an isocyanurate compound such as tris(N-trialkoxysilylpropyl)isocyanurate can be compounded as an adhesiveness imparting agent. Examples of the isocyanurate compound include 1,3,5-tris(N-trimethoxysilylpropyl)isocyanurate and the like. From the viewpoint of compatibility with the composition, the compounding amount of the adhesiveness imparting agent is preferably 0.01 to 5 parts by mass relative to 100 parts by mass of the (A) component.

Further, in the room-temperature-curable polyorganosiloxane composition in the embodiment, various kinds of additives normally compounded in this type of composition, such as an inorganic filler, a pigment, a thixotropy imparting agent, a viscosity modifier for improving extrusion workability, an ultraviolet absorbent, a fungicide, a heat resistance improver, and a flame retardant, can be compounded as needed within a range not obstructing the effects of the present invention. Examples of the inorganic filler include aerosol silica, baked silica, precipitated silica, aerosol titanium, and ones obtained by hydrophobizing their surfaces with organochlorosilanes, polyorganosiloxanes, hexamethyldisilazane or the like. Besides, calcium carbonate, organic acid surface-treated calcium carbonate, diatomaceous earth, pulverized silica, aluminosilicate, magnesia, alumina, and the like are also usable. When the inorganic filler is compounded, its compounding amount is preferably 100 parts by mass or less, and more preferably 50 parts by mass or less relative to 100 parts by mass of the (A) component.

The room-temperature-curable polyorganosiloxane composition in the embodiment is obtained by mixing the above (A) component and the (B) component, and the (C) component and the above components which are compounded as needed, with humidity blocked. The obtained composition has a viscosity of 20 mPa·s to 1000 mPa·s at 23° C. The viscosity is preferably 20 mPa·s to 500 mPa·s. Note that the room-temperature-curable polyorganosiloxane composition in the embodiment contains no solvent. Therefore, the room-temperature-curable polyorganosiloxane composition does not need a solvent removing process at the time of forming a cured coating film, and therefore never causes worsening work environment and corrosion and deterioration of electric/electronic components and a circuit board having those components mounted thereon due to volatilization of a solvent.

The room-temperature-curable polyorganosiloxane composition obtained in the above can be used as a so-called single-package room-temperature-curable composition which is stored as it is in an airtight container and cures only after being exposed to moisture in the air in use. Alternatively, the room-temperature-curable polyorganosiloxane composition in the embodiment can be used as a so-called multi-package room-temperature-curable composition in which, for example, the (A) component, and the cross-linking agent being the (C) component and the curing catalyst being the (B) component are separately prepared, separately stored in two to three separate containers as required, and mixed in use. Note that the order of mixing the components is not particularly limited.

The room-temperature-curable polyorganosiloxane composition of the present invention has a sufficiently low viscosity of 20 mPa·s to 1000 mPa·s at 23° C. as described above, and is thus has excellent in coatability and can be applied as it is by an ordinary coating method without being diluted with a solvent. The coating film quickly cures at room temperature by coming into contact with the moisture in the air. The cured coating film has a high hardness (Type A) of 60 or more and is therefore excellent in electric and mechanical properties, especially in scratch resistance.

Therefore, the composition of the present invention is useful for the use such as a coating material, a potting material, and the like of an electric/electronic apparatus, and is especially suitable for the use for protecting surfaces of electric/electronic components and of a circuit board having these components mounted thereon, such as a conformal coating agent. Concretely, it is suitably used as a coating material of, for example, electrodes, wiring, and the like in an electric/electronic apparatus in which electronic components such as a semiconductor device such as IC, a resistor, and a capacitor are mounted on a wiring board in which the electrodes and the wiring made of ITO, copper, aluminum, silver, gold, or the like are formed on a substrate made of epoxy resin, phenol resin, polyimide resin, or the like or on a substrate made of ceramic such as alumina.

When the room-temperature-curable polyorganosiloxane composition of the present invention is used as a coating material of electrodes and wiring of the wiring board, a dip method, a brush application method, a spray method, a dispense method, or the like is usable as a coating method, and the thickness of the coating layer is normally 0.01 to 3 mm, and preferably 0.05 to 2 mm. When the thickness is less than 0.01 mm, scratch resistance may not be sufficiently obtained. Besides, when the thickness exceeds 3 mm, not only a higher effect is not obtained, but also it takes time for the interior to cure, which is uneconomical.

Figure 1:
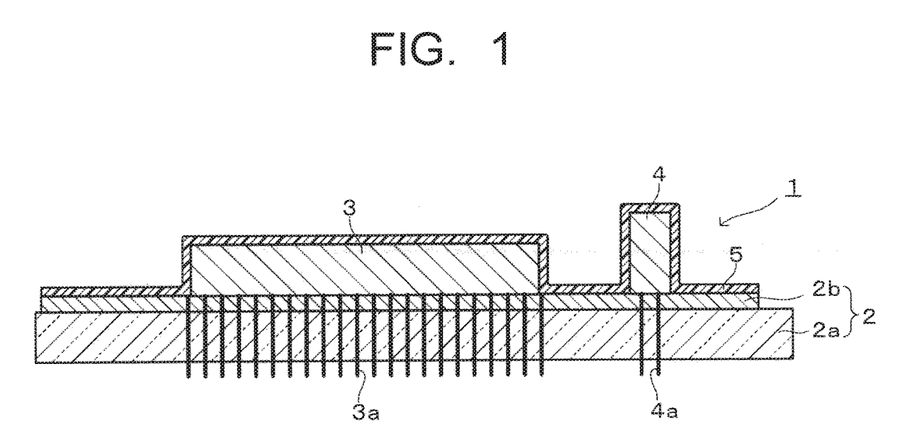
FIG. 1 is a cross-sectional view illustrating an example of an electric/electronic apparatus of the present invention.

Next, an electric/electronic apparatus of the present invention will be described referring to the drawings. FIG. 1 is a cross-sectional view illustrating an example of the electric/electronic apparatus (device) according to the present invention.

An electric/electronic apparatus 1 in the embodiment includes a wiring board 2 in which wiring 2b made of a conductor such as copper foil is formed on an insulating substrate 2a such as a glass epoxy substrate. Further, at predetermined positions of one main surface of such a wiring board 2, electric/electronic components such as an IC package 3 and a capacitor 4 are mounted and are electrically connected to the above-described wiring 2b. Incidentally, the IC package 3 and the capacitor 4 are connected to the wiring 2b by inserting lead terminals 3a, 4a of these components to component holes (not illustrated) of the wiring board 2 and joining them via solder or the like.

Further, on the component mounting surface of the wiring board 2, a cured coating film 5 made of the cured product of the above-described room-temperature-curable polyorganosiloxane composition of the present invention is formed so as to cover upper surfaces of the IC package 3 and the capacitor 4.

The electric/electronic apparatus 1 in the embodiment is high in reliability since the wiring board 2 and the electric/electronic components mounted on the main surface of the wiring board 2 are covered with the cured coating film 5 excellent in scratch resistance and less likely to peel off or curl up due to friction.

EXAMPLES

Hereinafter, the present invention will be described more concretely using examples, but these examples do not limit the range of the present invention. Note that, in the examples, each "part" represents "part by mass", each "%" represents "mass %", and each viscosity indicates a value at 23° C. and a relative humidity of 50%.

Synthesis Example 1

A ends trimethylsilyl group-terminated branched polymethylsiloxane (A12-1) being the branched polyorganosiloxane used in examples as the (A1) component was synthesized as follows.

Into a 3 L separable flask 1300 g of water was fed, and a mixture of 410 g of dimethyldichlorosilane, 123 g of methyltrichlorosilane, and 16 g of trimethylchlorosilane was dropped into the flask while they were being agitated.

Subsequently, a hydrochloric acid layer at a lower layer was removed using a separatory funnel and 650 g of water and 20 g of salt were added thereto and agitated, then a salt solution layer was removed, and filtration was performed. Thus, 800 g of a branched polyorganosiloxane having silanol groups at ends was obtained. Next, the obtained polyorganosiloxane was subjected to methoxylation reaction of the ends.

Into a 1 L separable flask 200 g of the obtained polyorganosiloxane having the silanol groups at ends and having a branch structure (three-dimensional network structure) and 50 g of methyltrimethoxysilane were fed and agitated at room temperature for 5 minutes, and then 0.76 g of formic acid was added into the flask while they were being agitated. Thereafter, the temperature in the flask was increased up to 80° C. and heating agitation was performed. After 30 minutes, demethanolation reaction between the silanol group and the methyltrimethoxysilane started, and methanol was by-produced. The by-produced methanol was removed from the inside of the flask using a drain pipe. After heating agitation was performed at 80° C. for 24 hours, cooling was performed down to room temperature. Then, it was confirmed by IR spectrum measurement that the absorption peak of the silanol group disappeared. Then, excessive methyltrimethoxysilane was distilled off to the outside of the system by distillation under reduced pressure.

Investigation of the composition and structure of the thus-obtained polyorganosiloxane (A12-1) using $^1$H-NMR and $^{29}$Si-NMR revealed that the polyorganosiloxane was a branched polyorganosiloxane having an average composition composed of an M unit represented by a formula: $(CH_3)_3SiO_{1/2}$, a D unit represented by a formula: $(CH_3)_2SiO_{2/2}$, and a T unit represented by a formula: $(CH_3)(OCH_3)_{0.2}SiO_{2.8/2}$, and having a content molar ratio among the units of M:D:T=1:19:5. Further, the viscosity of the obtained polyorganosiloxane (A12-1) was 40 mPa·s and its Mw was 2,700.

Synthesis Example 2

As the (A2) component used in examples, a polyorganosiloxane (A2-1) corresponding to the polyorganosiloxane (a2) was synthesized as follows.

Into a 5 L separable flask 1410 g of toluene and 135 g of methanol were fed, and a mixture of 1326 g of methyltrimethoxysilane and 20 g of methyltrichlorosilane was added to the inside of the flask while they were being agitated. Then, the temperature in the flask was increased up to 35° C. using a mantle heater, and then 510 g of tap water was dropped into the flask. The liquid temperature after the dropping increased up to 60° C. After heat refluxing was continued for 2 hours, 510 g of tap water was added and liquid separation was performed, and a water/methanol/HCl layer being an upper layer was discarded. A resin/toluene layer being a lower layer was subjected to dehydration at normal pressure, and then excessive toluene was distilled off by reduced-pressure stripping, to set the nonvolatile content to 50%. After the filtration, 1268 g of a polyorganosiloxane having silanol groups at ends and having a three-dimensional network structure was obtained. Next, the obtained polyorganosiloxane was subjected to methoxylation reaction of the ends.

Into a 1 L separable flask 400 g of a 50% toluene solution of the obtained polyorganosiloxane having the silanol groups at ends and having a branch structure (three-dimensional network structure) and 112 g of methyltrimethoxysilane were fed and agitated at room temperature for 5 minutes, and then 0.76 g of formic acid was added into the flask while they were being agitated. Thereafter, the temperature in the flask was increased up to 80° C. and heating agitation was performed. After 30 minutes, demethanolation reaction between the silanol group and the methyltrimethoxysilane started, and methanol was by-produced. The by-produced methanol was removed from the inside of the flask using a drain pipe. After heating agitation was performed at 80° C. for 24 hours, cooling was performed down to room temperature. Then, it was confirmed by IR spectrum measurement that the absorption peak of the silanol group disappeared. Then, excessive methyltrimethoxysilane and toluene were distilled off to the outside of the system by distillation under reduced pressure.

Investigation of the composition and structure of the thus-obtained polyorganosiloxane (A2-1) using $^1$H-NMR revealed that the polyorganosiloxane was a polyorganosiloxane having a three-dimensional network structure represented by an average composition formula: $(CH_3)_{1.0}Si(OCH_3)_{0.2}O_{1.4}$. Further, the polyorganosiloxane (A2-1) was in a solid state at normal temperature and its Mw was 7,000.

Synthesis Example 3

As the (A2) component used in examples, a polyorganosiloxane (A2-2) corresponding to the polyorganosiloxane (a2) was synthesized as follows.

Into a 5 L separable flask 1410 g of toluene and 135 g of methanol were fed, and a mixture of 1326 g of methyltrimethoxysilane, 130 g of dimethyldimethoxysilane, and 20 g of methyltrichlorosilane was added to the inside of the flask while they were being agitated. Then, the temperature in the flask was increased up to 35° C. using a mantle heater, and then 510 g of tap water was dropped into the flask. The liquid temperature after the dropping increased up to 60° C. After heat refluxing was continued for 2 hours, 510 g of tap water was added and liquid separation was performed, and a water/methanol/HCl layer being an upper layer was discarded. A resin/toluene layer being a lower layer was subjected to dehydration at normal pressure, and then excessive toluene was distilled off by reduced-pressure stripping, to set the nonvolatile content to 50%. After the filtration, 1268 g of a polyorganosiloxane having silanol groups at ends and having a three-dimensional network structure was obtained. Next, the obtained polyorganosiloxane was subjected to methoxylation reaction of the ends.

Into a 1 L separable flask 400 g of a 50% toluene solution of the obtained polyorganosiloxane having the silanol groups at ends and having a branch structure (three-dimensional network structure) and 112 g of methyltrimethoxysilane were fed and agitated at room temperature for 5 minutes, and then 0.76 g of formic acid was added into the flask while they were being agitated. Thereafter, the temperature in the flask was increased up to 80° C. and heating agitation was performed. After 30 minutes, demethanolation reaction between the silanol group and the methyltrimethoxysilane started, and methanol was by-produced. The by-produced methanol was removed from the inside of the flask using a drain pipe. After heating agitation was performed at 80° C. for 24 hours, cooling was performed down to room temperature. Then, it was confirmed by IR spectrum measurement that the absorption peak of the silanol group disappeared. Then, excessive methyltrimethoxysilane and toluene were distilled off to the outside of the system by distillation under reduced pressure.

Investigation of the composition and structure of the thus-obtained polyorganosiloxane (A2-2) using $^1$H-NMR revealed that the polyorganosiloxane was a polyorganosiloxane having a three-dimensional network structure represented by an average composition formula: $(CH_3)_{1.1}Si(OCH_3)_{0.2}O_{1.35}$. Further, the polyorganosiloxane (A2-2) was in a semisolid state (starch syrup state) at normal temperature and its Mw was 5,000.

Synthesis Example 4

As the (A2) component used in examples, a polyorganosiloxane (A2-3) corresponding to the polyorganosiloxane (a2) was synthesized as follows.

Into a 5 L separable flask 1410 g of toluene and 135 g of methanol were fed, and a mixture of 1739 g of methyltrimethoxysilane, 298 g of dimethyldimethoxysilane, and 20 g of methyltrichlorosilane was added to the inside of the flask while they were being agitated. Then, the temperature in the flask was increased up to 35° C. using a mantle heater, and then 510 g of tap water was dropped into the flask. The liquid temperature after the dropping increased up to 60° C. After heat refluxing was continued for 2 hours, 510 g of tap water was added and liquid separation was performed, and a water/methanol/HCl layer being an upper layer was discarded. A resin/toluene layer being a lower layer was subjected to dehydration at normal pressure, and then excessive toluene was distilled off by reduced-pressure stripping, to set the nonvolatile content to 50%. After the filtration, 1268 g of a polyorganosiloxane having silanol groups at ends and having a three-dimensional network structure was obtained. Next, the obtained polyorganosiloxane was subjected to methoxylation reaction of the end.

Into a 1 L separable flask 400 g of a 50% toluene solution of the obtained polyorganosiloxane having the silanol groups at ends and having a branch structure (three-dimensional network structure) and 112 g of methyltrimethoxysilane were fed and agitated at room temperature for 5 minutes, and then 0.76 g of formic acid was added into the flask while they were being agitated. Thereafter, the temperature in the flask was increased up to 80° C. and heating agitation was performed. After 30 minutes, demethanolation reaction between the silanol group and the methyltrimethoxysilane started, and methanol was by-produced. The by-produced methanol was removed from the inside of the flask using a drain pipe. After heating agitation was performed at 80° C. for 24 hours, cooling was performed down to room temperature. Then, it was confirmed by IR spectrum measurement that the absorption peak of the silanol group disappeared. Then, excessive methyltrimethoxysilane and toluene were distilled off to the outside of the system by distillation under reduced pressure.

Investigation of the composition and structure of the thus-obtained polyorganosiloxane (A2-3) using $^1$H-NMR revealed that the polyorganosiloxane was a polyorganosiloxane having a three-dimensional network structure represented by an average composition formula: $(CH_3)_{1.2}Si(OCH_3)_{0.22}O_{1.29}$. Further, the polyorganosiloxane (A2-3) was in a semisolid state (starch syrup state) at normal temperature and its Mw was 29,000.

Example 1

In 50 parts of (A11-1) both ends methyldimethoxysilyl group-terminated linear polydimethylsiloxane (viscosity of 10 mPa·s) classified into the above-described polyorganosiloxane (a11) as the (A1) component, 50 parts of the polyorganosiloxane (A2-1) represented by the average composition formula: $(CH_3)_{1.0}Si(OCH_3)_{0.2}O_{1.4}$ obtained in Synthesis example 2 (Mw of 7,000), 5 parts of the (C) methyltrimethoxysilane, 2 parts of the (B) diisopropoxy-bis(ethyl acetoacetate) titanium, and 0.2 parts of 1,3,5-tris(N-trimethoxysilylpropyl)isocyanurate were compounded and uniformly mixed with humidity blocked, whereby a polyorganosiloxane composition was obtained.

Examples 2 to 12

The components listed in Table 1 were compounded in compositions listed in the same table and mixed as in Example 1, whereby polyorganosiloxane compositions were obtained.

Note that abbreviations of the polyorganosiloxanes used as the (A1) component in Table 1 are as follows.
(A11) represents a linear polyorganosiloxane classified into the polyorganosiloxane (a11),
(A12) represents a branched polyorganosiloxane, and (A13) represents a partially hydrolyzed condensate of a silane compound (a12).
(A11-1) represents a both ends methyldimethoxysilyl group-terminated linear polydimethylsiloxane (viscosity of 10 mPa·s) classified into the polyorganosiloxane (a11) as described above.
(A11-2) represents a both ends trimethoxysilyl group-terminated linear polydimethylsiloxane (viscosity of 15 mPa·s) classified into the polyorganosiloxane (a11).
(A11-3) represents a both ends trimethoxysilyl group-terminated linear polydimethylsiloxane (viscosity of 100 mPa·s) classified into the polyorganosiloxane (a11).
(A12-1) represents a branched polyorganosiloxane having a viscosity of 40 mPa·s and an Mw of 2,700 obtained in Synthesis example 1.
(A13-1) represents a partially hydrolyzed condensate of methyltrimethoxysilane (viscosity of 18 mPa·s, number of Si atoms of 7).

Besides, abbreviations of the polyorganosiloxanes used as the (A2) component are as follows.
(A2-1) represents the polyorganosiloxane represented by the average composition formula: $(CH_3)_{1.0}Si(OCH_3)_{0.2}O_{1.4}$ obtained in Synthesis example 2 (Mw of 7,000) as describe above.
(A2-2) represents the polyorganosiloxane represented by the average composition formula: $(CH_3)_{1.1}Si(OCH_3)_{0.2}O_{1.35}$ obtained in Synthesis example 3 (Mw of 5,000).
(A2-3) represents the polyorganosiloxane represented by the average composition formula: $(CH_3)_{1.2}Si(OCH_3)_{0.22}O_{1.29}$ obtained in Synthesis example 4 (Mw of 29,000).

Comparative Examples 1 to 4

The components listed in Table 2 were compounded in compositions listed in the same table and mixed as in Example 1, whereby polyorganosiloxane compositions were obtained. Note that in place of the (A) component in examples, a both ends methyldimethoxysilyl group-terminated linear polydimethylsiloxane (viscosity of 1,000 mPa·s) was used as a (A1)' component in Comparative example 3. Besides, in place of the (B) diisopropoxy-bis(ethyl acetoacetate) titanium, a (B)' dibutyltin dilaurate was used as a curing catalyst in Comparative examples 1 and 4.

The polyorganosiloxane compositions obtained in Examples 1 to 12 and Comparative examples 1 to 4 were subjected to measurement of various properties by the method illustrated below and thereby evaluated. These results are listed together with the compositions in Table 1 for Examples 1 to 12 and in Table 2 for Comparative examples 1 to 4.

[Viscosity]
The viscosity of each of the above-described polyorganosiloxane compositions was measured according to JIS K6249. The measurement was performed using a rotational viscometer (manufactured by Shibaura Semteck Co., Ltd., product name: VISMETRON VDA-2) at a rotation speed of 30 rpm and with a No. 2 rotor.

[Tack-Free Time]
The tack-free time of each of the above-described polyorganosiloxane compositions was measured according to JIS K6249. Its specimen was put flat on an aluminum petri dish (the thickness of the specimen was 3 mm) without entrance of bubbles, and then its surface was lightly touched by a fingertip cleaned with ethyl alcohol. The time until the specimen no longer adhered to the fingertip was regarded as the tack-free time (minute).

[Hardness]
The hardness of each of the above-described polyorganosiloxane compositions was measured as follows according to JIS K6249. More specifically, the polyorganosiloxane composition was molded into a sheet shape with a thickness of 2 mm, and then let stand for 3 days at 23° C. and 50% RH and thereby cured. Next, three obtained cured sheets were stacked and the hardness was measured by a durometer (Type A).

[Scratch Resistance]
Each of the above-described polyorganosiloxane compositions was applied with a thickness of 100 μm on a comb-like electrode substrate (copper electrode, a pattern width of 0.316 mm) specified by JIS Z3197 (ISO9455), and was let stand for 3 days at 23° C. and 50% RH and thereby cured. Next, a cured coating film formed was subjected to a pencil hardness test according to JIS K5600-5-4, and thereby subjected to evaluation of scratch resistance. In the pencil hardness test, lines were drawn with a 750 g load by using 2B and 4B pencils, the later state of the cured coating film was visually observed, and the evaluation was performed according to the following criteria.
<Evaluation Criteria>
Evaluation "○": There is no curling up.
Evaluation "x": The cured coating film is broken. There is curling up.

TABLE 1

| | | | | Example | | | | | | | | | | | | |
|---|---|---|---|---|---|---|---|---|---|---|---|---|---|---|---|---|
| | | | | 1 | 2 | 3 | 4 | 5 | 6 | 7 | 8 | 9 | 10 | 11 | 12 |
| Composition (part by mass) | (A1) | (A11) | (A11-1) Both ends methyldimethoxysilyl group-terminated polydimethylsiloxane (viscosity; 10 mPa·s) | 50 | 40 | 60 | — | 30 | 25 | — | 50 | 40 | 60 | 20 | 20 |
| | | | (A11-2) Both ends trimethoxysilyl group-terminated polydimethylsiloxane (viscosity; 15 mPa·s) | — | — | — | 30 | — | — | — | — | — | — | — | — |
| | | | (A11-3) Both ends trimethoxysilyl group-terminated polydimethylsiloxane (viscosity; 100 mPa·s) | — | — | — | — | — | — | — | — | — | — | 30 | — |
| | | (A12) | (A12-1) Ends trimethylsilyl group-terminated branched polymethylsiloxane (viscosity; 40 mPa·s) | — | — | — | — | — | — | 30 | — | — | — | — | — |
| | | (A13) | (A13-1) Partially hydrolyzed condensate of methyl-trimethoxysilane (number of Si atoms; 7) (viscosity; 18 mPa·s) | — | — | — | — | — | 5 | — | — | — | — | — | — |
| | (A1)' | | Both ends methyldimethoxysilyl group-terminated polydimethylsiloxane (viscosity; 1000 mPa.s) | — | — | — | — | — | — | — | — | — | — | — | — |
| | (A2) | | (A2-1) $(CH_3)_{1.0}Si(OCH_3)_{0.2}O_{1.4}$ (MW = 7,000) | 50 | — | — | — | 70 | 70 | 70 | 50 | — | — | — | — |
| | | | (A2-2) $(CH_3)_{1.1}Si(OCH_3)_{0.2}O_{1.35}$ (MW = 5,000) | — | 60 | — | 70 | — | — | — | — | 60 | — | 50 | — |
| | | | (A2-3) $(CH_3)_{1.2}Si(OCH_3)_{0.22}O_{1.29}$ (MW = 29,000) | — | — | 40 | — | — | — | — | — | — | 40 | — | 80 |
| | (B) | | (B) Diisopropoxy-bis(ethyl acetoacetate) titanium | 2 | 2 | 2 | 2 | 2 | 2 | 2 | 2 | 2 | 2 | 2 | 3 |
| | (B)' | | Dibutyltin dilaurate | — | — | — | — | — | — | — | — | — | — | — | — |
| | (C) | | (C) Methyltrimethoxysilane | 5 | 6 | 5 | 5 | 5 | — | 5 | 5 | 6 | 5 | 5 | 5 |
| | Other | | 1,3,5-tris(N-trimethoxysilylpropyl)isocyanurate | 0.2 | 0.2 | 0.2 | 0.2 | 0.2 | 0.2 | 0.2 | — | — | — | 0.2 | 0.4 |
| Property evaluation | Composition | | Viscosity(mPa·s) | 200 | 190 | 200 | 210 | 200 | 300 | 400 | 200 | 190 | 200 | 220 | 450 |
| | | | Tack-free time (minute) | 6 | 7 | 6 | 7 | 6 | 6 | 7 | 6 | 7 | 6 | 7 | 7 |
| | Cured product | Hardness | Type A | 85 | 90 | 80 | 92 | 80 | 80 | 75 | 85 | 90 | 80 | 75 | 90 |
| | | Scratch resistance | 2B | ○ | ○ | ○ | ○ | ○ | ○ | ○ | ○ | ○ | ○ | ○ | ○ |
| | | | 4B | ○ | ○ | ○ | ○ | ○ | ○ | ○ | ○ | ○ | ○ | ○ | ○ |
| | | Adhesiveness (epoxy glass) | | ○ | ○ | ○ | ○ | ○ | ○ | ○ | ○ | ○ | ○ | ○ | ○ |

TABLE 2

| | | | | Comparative example | | | |
|---|---|---|---|---|---|---|---|
| | | | | 1 | 2 | 3 | 4 |
| Composition (part by mass) | (A1) | (A11) | (A11-1) Both ends methyldimethoxysilyl group-terminated polydimethylsiloxane (viscosity; 10 mPa·s) | — | 100 | — | 45 |
| | | | (A11-2) Both ends trimethoxysilyl group-terminated polydimethylsiloxane (viscosity; 15 mPa·s) | — | — | — | — |
| | | (A12) | (A12-1) Ends trimethylsilyl group-terminated branched polymethylsiloxane (viscosity; 40 mPa·s) | — | — | — | — |
| | | (A13) | (A13-1) Partially hydrolyzed condensate of methyltrimethoxysilane (number of Si atoms; 7) (viscosity; 18 mPa·s) | — | — | — | 5 |
| | (A1)' | | Both ends methyldimethoxysilyl group-terminated polydimethylsiloxane (viscosity 1000 mPa·s) | — | — | 100 | — |
| | (A2) | | (A2-1) $(CH_3)_{1.0}Si(OCH_3)_{0.2}O_{1.4}$ (MW = 7,000) | 100 | — | — | 50 |
| | | | (A2-2) $(CH_3)_{1.1}Si(OCH_3)_{0.2}O_{1.35}$ (MW = 5,000) | — | — | — | — |
| | | | (A2-3) $(CH_3)_{1.2}Si(OCH_3)_{0.22}O_{1.29}$ (MW = 29,000) | — | — | — | — |

TABLE 2-continued

| | | | Comparative example | | | |
|---|---|---|---|---|---|---|
| | | | 1 | 2 | 3 | 4 |
| | (B) | (B) Diisopropoxy-bis(ethyl acetoacetate) titanium | 2 | 2 | 2 | — |
| | (B)' | Dibutyltin dilaurate | 0.2 | — | — | 0.2 |
| | (C) | (C) Methyltrimethoxysilane | 5 | 5 | 5 | — |
| | Other | 1,3,5-tris(N-trimethoxysilylpropyl)isocyanurate | 0.2 | 0.2 | 0.2 | 0.2 |
| Property evaluation | Composition | Viscosity(mPa · s) | Impossible to fabricate and measure sample because of solid | 10 | 500 | 270 |
| | | Tack-free time (minute) | | 5 | 6 | 300 |
| | Cured product | Hardness Type A | | Fragile and an unmeasurable | 27 | 85 |
| | | Scratch resistance 2B | | x | x | ○ |
| | | 4B | | x | x | ○ |
| | | Adhesiveness (epoxy glass) | | ○ | ○ | ○ |

From Table 1, it was found that each of the polyorganosiloxane compositions obtained in Examples 1 to 12 had a viscosity suitable for application of a thin uniform film, and further formed a cured coating film having a high hardness (Type A) of 60 or more and excellent scratch resistance.

In contrast, as shown in Table 2, polyorganosiloxane compositions having a viscosity suitable for application of a thin uniform film were not obtained in Comparative examples 1 and 2. Besides, the polyorganosiloxane composition obtained in Comparative example 3 had a viscosity capable of application of a thin film, but the cured coating film obtained was low in hardness and poor in scratch resistance. Further, the polyorganosiloxane composition obtained in Comparative example 4 had a long tack-free time and thus took too much time for curing.

Further, by investigation of adhesiveness to epoxy glass of the polyorganosiloxane compositions obtained in Examples 1 to 12 and Comparative examples 1 to 4 as follows, excellent results were obtained. The results are listed in Table 1 and Table 2.

[Adhesiveness]
The polyorganosiloxane composition was applied with a length of 50 mm, a width of 10 mm, and a thickness of 1 mm on the surface of a substrate made of epoxy glass, and let stand for 3 days in an atmosphere of 23° C., 50% RH and thereby cured. Then, the cured product was scraped off from the surface of the substrate with a metal spatula, and the state of peeling of the cured product at this time was investigated. Then, the adhesiveness was evaluated based on the following criteria.

<Evaluation Criteria>
Adhesiveness "○": The cured product cannot be peeled off from the interface with the substrate and the cured product is broken.
Adhesiveness "Δ": A part of the cured product is peeled off from the interface with the substrate and a part of the cured product is broken.
Adhesiveness "x": The cured product can be peeled off from the interface with the substrate.

A room-temperature-curable polyorganosiloxane of the present invention is useful for the use such as a coating material, a potting material, and the like of an electric/electronic apparatus, and is especially suitable as a conformal coating agent in an electric/electronic apparatus in which electronic components and the like are mounted on a substrate.

What is claimed is:
1. A room-temperature-curable polyorganosiloxane composition, comprising:
   (A) 100 parts by mass of a polyorganosiloxane mixture obtained by mixing
      (A1) 10 to 80 parts by mass of a polyorganosiloxane having two or more alkoxy groups bonded to silicon atoms in a molecule and a viscosity at 23° C. of 3 mPa·s to 500 mPa·s, and
      (A2) 90 to 20 parts by mass of a polyorganosiloxane represented by an average composition formula (a2), having a weight-average molecular weight (Mw) of 2,000 to 100,000 and a three-dimensional network structure, and being in a solid state or in a semisolid state at normal temperature,

$$R^1_a Si(OR^2)_b O_{\{4-(a+b)\}/2} \quad (a2)$$

where $R^1$ represents an unsubstituted monovalent hydrocarbon group or a monovalent hydrocarbon group in which part of hydrogen atoms is substituted by a halogen atom or a cyano-alkyl group, $R^2$ represents an alkyl group or an alkoxy-substituted alkyl group being an alkyl group in which part of hydrogen atoms is substituted by an alkoxy group, and a and b are positive numbers satisfying $0.5 \leq a \leq 1.5$ and $0 < b < 3$, and
   (B) 0.1 to 15 parts by mass of an organic titanium compound as a curing catalyst,
   wherein the (A1) component comprises a polyorganosiloxane being a partially hydrolyzed condensate of a silane compound represented by a formula (a12), $$R^8_e Si(OR^9)_{4-e} \quad (a12)$$

where $R^8$ represents an unsubstituted monovalent hydrocarbon group or a monovalent hydrocarbon group in which part of hydrogen atoms is substituted by a halogen atom or a cyano-alkyl group, $R^9$ represents an alkyl group or an alkoxy-substituted alkyl group being an alkyl group in which part of hydrogen atoms is substituted by an alkoxy group, and e is 0, 1 or 2.

2. The room-temperature-curable polyorganosiloxane composition according to claim 1, further comprising:
   (C) 0.1 to 15 parts by mass of a silane compound represented by a formula (c1), $$R^3_c Si(OR^4)_{4-c} \quad (c1)$$

where $R^3$ represents an unsubstituted monovalent hydrocarbon group or a monovalent hydrocarbon group in which part of hydrogen atoms is substituted by a halogen atom or a cyano-alkyl group, $R^4$ represents an alkyl group or an alkoxy-substituted alkyl group being an alkyl group in which part of hydrogen atoms is substituted by an alkoxy group, and c is 0, 1 or 2.

3. The room-temperature-curable polyorganosiloxane composition according to claim 1,
wherein the (A1) component comprises a polyorganosiloxane represented by a following general formula (a11), (a11)

where $R^5$ represents an alkyl group or an alkoxy-substituted alkyl group being an alkyl group in which part of hydrogen atoms is substituted by an alkoxy group, $R^6$ and $R^7$ are each an unsubstituted monovalent hydrocarbon group or a monovalent hydrocarbon group in which part of hydrogen atoms is substituted by a halogen atom or a cyano-alkyl group, X is a bivalent oxygen (oxy group) or a bivalent hydrocarbon group, d is 0 or 1, and n is an integer so that the viscosity at 23° C. becomes 3 mPa·s to 500 mPa·s.

4. The room-temperature-curable polyorganosiloxane composition according to claim 1, being a coating composition for an electrode and/or wiring of an electric/electronic apparatus.

5. An electric/electronic apparatus comprising, a coating film made of a cured product of the room-temperature-curable polyorganosiloxane composition according to claim 1, on a surface of an electrode and/or wiring.

* * * * *